United States Patent Office 3,391,067
Patented July 2, 1968

---

3,391,067
ELECTROLYTIC PROCESS FOR THE PREPARATION OF MIXED ORGANIC LEAD COMPOUNDS AND ELECTROLYTE THEREFOR
David G. Braithwaite, Chicago, Ill., assignor to Nalco Chemical Company, Chicago, Ill., a corporation of Delaware
No Drawing. Continuation-in-part of application Ser. No. 811,262, May 6, 1959. This application Mar. 6, 1961, Ser. No. 93,361
The portion of the term of the patent subsequent to Nov. 7, 1978, has been disclaimed
17 Claims. (Cl. 204—59)

ABSTRACT OF THE DISCLOSURE

An electrolytic process for the manufacture of organic lead compounds containing different hydrocarbon radicals linked to the same lead atom. The electrolyte comprises a substantially anhydrous solution of at least one Grignard reagent and at least one extraneous organic halide, the organic radical of at least one said Grignard reagent being different from the organic radical of at least one said organic halide.

---

This application is a continuation-in-part of my co-pending application Ser. No. 811,262, filed May 6, 1959, now U.S. Patent 3,007,858.

This invention relates to the manufacture of organic lead compounds and more particularly to the manufacture of organic lead compounds containing two different hydrocarbon radicals linked directly to metallic lead.

In said copending application there is described a process for preparing organic lead compounds by electrolyzing a substantially anhydrous solution of a Grignard reagent in an organic solvent for the Grignard reagent, using a lead anode, and adding extraneous organic halide to the electrolyte. By the term "extraneous organic halide" is meant an organic halide which is added as such as distinguished from the organic halide required to form a Grignard reagent from magnesium considering the formula of a Grignard reagent to be RMgX, where R represents the organic radical, Mg represents magnesium, and X represents a halogen atom, such as chlorine, bromine or iodine.

One of the objects of the present invention is to provide a new and improved process for preparing compounds in which different organic radicals are linked to metallic lead. Other objects will appear hereinafter.

In accordance with the present invention a substantially anhydrous solution of a Grignard reagent in an organic solvent for the Grignard reagent is electrolyzed, using a lead anode, and adding extraneous organic halide to the electrolyte, subject to the condition that the electrolyzing action is carried out in the presence of at least two different organic radicals which react with the lead. These organic radicals are supplied in several possible ways, namely (1) by employing a mixture of Grignard reagents, for example, methyl magnesium chloride and ethyl magnesium chloride, methyl magnesium chloride and propyl magnesium chloride, methyl magnesium chloride and butyl magnesium chloride, methyl magnesium chloride and isobutyl magnesium chloride, methyl magnesium chloride and secondary butyl magnesium chloride, methyl magnesium chloride and tertiary butyl magnesium chloride, methyl magnesium chloride and isopropyl magnesium chloride, methyl magnesium chloride and amyl magnesium chloride, methyl magnesium chlroide and isoamyl magnesium chloride, methyl magnesium chloride and hexyl magnesium chloride, methyl magnesium chloride and phenyl magnesium chloride, methyl magnesium chloride and cyclohexyl magnesium chloride, methyl magnesium chloride and benzyl magnesium chloride, and adding to such mixture an organic halide, such as, for example, methyl chloride, ethyl chloride, propyl chloride, isopropyl chloride, butyl chloride, isobutyl chloride, secondary butyl chloride and tertiary butyl chloride, or the corresponding bromides and iodides; or, (2) by employing as the electrolyte a Grignard reagent in which there is only one organic radical such as, for example, methyl magnesium chloride, ethyl magnesium chloride, propyl magnesium chloride, butyl magnesium chloride, isobutyl magnesium chloride, secondary butyl magnesium chloride, tertiary butyl magnesium chloride, phenyl magnesium chloride, cyclohexyl magnesium chloride, benzyl magnesium chloride, and homologues thereof, including the corresponding iodides and bromides, and adding as the extraneous organic halide two or more organic halides, such as for example, both methyl chloride and ethyl chloride, both methyl chloride and isopropyl chloride, both methyl chloride and butyl chloride, both methyl chloride and tertiary butyl chloride, and/or the corresponding bromides and iodides; or (3) mixed Grignard reagents can be used with two or more organic halides, such as, for example, a mixture of methyl magnesium chloride and ethyl magnesium chloride in conjunction with the use of both methyl chloride and ethyl chloride as extraneous organic halides; or (4) a single Grignard reagent can be used with a single extraneous organic halide where the organic radical of the halide is different from that of the Grignard reagent, for example, methyl magnesium chloride and tertiary butyl chloride. It will also be understood that different halogen atoms may be present with the same organic radical. Thus, a mixture of methyl chloride and methyl bromide may be used instead of methyl chloride alone or a mixture of methyl chloride and methyl iodide may be used instead of methyl chloride alone in any of the foregoing procedures 1, 2, 3 or 4. Similarly, a mixture of tertiary butyl chloride and tertiary butyl bromide or iodide may be used instead of tertiary butyl chloride alone in any of the foregoing procedures 1, 2, 3 or 4.

The preferred method of practicing the invention is to use a single Grignard reagent of a type which is easily prepared, such as, for example, methyl magnesium chloride or ethyl magnesium chloride or other Grignard reagents derived from primary alkyl halides and magnesium. The desired product is then obtained by adding two more organic halides to the electrolyte as extraneous organic halides. This method of controlling the reaction is especially important where it is desired to make organic lead compounds in which the organic radical is a secondary or tertiary radical because the Grignard reagent containing secondary and tertiary organic radicals are rather difficult to prepare. As a specific example where it is desired to prepare organic lead compounds containing one or more tertiary butyl radicals the preferred procedure is to electrolyze the lead anode in a solvent solution of a Grignard reagent derived from a primary alkyl halide and magnesium and to add a tertiary butyl halide such as tertiary butyl chloride, tertiary butyl bromide, tertiary butyl iodide, or mixtures thereof, as the extraneous organic halide. In this way, for instance, by employing methyl magnesium chloride as the Grignard reagent and adding tertiary butyl chloride as the extraneous halide lead compounds are produced containing methyl radicals and tertiary butyl radicals linked directly to metallic lead. Specific examples of such compound are dimethyl-ditertiary butyl lead and trimethyl tertiary butyl lead. Similarly, ethyl tertiary butyl lead compounds are obtained by employing ethyl magnesium chloride or the corresponding bromide or iodide as the Grignard reagent and adding tertiary butyl chloride, bromide or iodide as the extraneous halide.

The cathode may be composed of a suitable conducting but non-reactive material, such as platinum, stainless steel, ordinary steel, graphite, or other conducting material, which does not dissolve in the electrolyte. In some cases the cathode may be composed of the same material as the anode. Thus, both the cathode and the anode can be composed of lead. It is preferable, however, that the anode be composed of lead and the cathode of steel.

The solvent for the Grignard reagent must be relatively inert under the conditions of the process. For this purpose it should not contain any labile hydrogen which is readily reactive. It may have some dielectric properties but it should have sufficient conductivity to permit the passage of a current between the anode and the cathode. Solvents containing aliphatic hydrocarbon groups connected to oxygen atoms or nitrogen atoms are especially useful. Low boiling solvents, such as, diethylether, can be employed but are difficult to handle and require special methods for the separation of the organic metallo compounds. Solvents, such as, tetrahydrofuran, can be employed. Examples of organic ether solvents are dimethylether, diethylether, and high molecular weight dialkylethers, including the ethers of polyoxyethylene glycols, polyoxypropylene glycols and polyoxyethylene-polyoxypropylene glycols which are liquid under the conditions of reaction. Special mention may be made of the dimethylether of diethylene glycol, the dipropylether of dipropylene glycol, the dibutylether of diethylene glycol and the dimethylether of dipropylene glycol. Examples of solvents containing nitrogen are trihexylamine, triamylamine, pyridine and quinoline.

The temperatures used are normally above the freezing point of the solution and below the boiling points of the solvent and the desired organic lead compound. In general, it is preferable to use temperatures within the range of 20° C. to 50° C.

The pressures used are normally sufficient to maintain the liquid phase with the particular solvent and temperature conditions employed. It is usually preferable to operate the process under a superatmospheric pressure which does not exceed five atmospheres.

One way of carrying out the process is to electrolyze the electrolyte until the Grignard reagent therein is substantially exhausted. Another way is to separate a part of the electrolyte and recover at least a part of the desired product, thereafter returning separated solvent and also Grignard reagent to the cell. The present invention is not particularly concerned with the manner in which the product is recovered.

The invention will be further illustrated but is not limited by the following examples in which the quantities are stated in parts by weight unless otherwise indicated.

Example I

The process can be carried out in various types of cells but one cell which has been found to be particularly suitable is a pipe cell made from a 2 inch diameter steel pipe about 30 inches long with ½ inch flange openings welded on opposite sides of the pipe 24 inches apart to form inlet openings for introducing and withdrawing the electrolyte. The center of the bottom inlet opening is about 2 inches from the bottom of the cell and the center of the top outlet opening is about 4 inches from the top of the cell. A layer of fine mesh woven polypropylene filaments is used as a liner on the inside of the pipe to separate the cathode from lead pellets which form the anode material. A lead rod is inserted into the center of the cell longitudinally and connected to a positive source of electricity. A negative source of electricity is connected to the outside of the pipe so that the pipe itself forms the cathode. The area of the cathode is approximately 92 square inches. The area of the screen is approximately 84.25 square inches. The available volume within the cell is approximately 18.65 cubic inches. The cell is charged with lead pellets.

A methyl Grignard solution is prepared by reacting methyl chloride and metallic magnesium in the dibutylether of diethylene glycol in proportions of approximately one mole of methyl chloride per mole of metallic magnesium per mole of said ether. The solution is recirculated externally of the cell through a heat exchanger at an average flow rate of 4 gallons per minute until a temperature of 38° C. is obtained. Extraneous tertiary butyl chloride is added to the cell in an amount sufficient to give an initial concentration of 3% by weight of the total solution. The current is turned on using a voltage of 30 volts and an average amperage of 10 amperes and the electrolysis is continued until 90% of the Grignard reagent has been converted. During the electrolysis additional tertiary butyl chloride is added at intervals to maintain a concentration of 3% by weight of the solution. The lead product containing both methyl and tertiary butyl radicals linked directly to metallic lead is recovered by removal of the solvent.

Example II

The procedure is the same as in Example I except that one mole of tetrahydrofuran per mole of Grignard reagent is added to the electrolyte initially.

Example III

The procedure is the same as in Example I except that 4.5 moles of benzene per mole of Grignard reagent is added to the electrolyte initially.

Example IV

The procedure is the same as in Example I except that one mole of tetrahydrofuran per mole of Grignard reagent and 4.5 moles of benzene per mole of Grignard reagent are added to the electrolyte initially.

Example V

The procedure is the same as in Example I except that 0.3 mole of methyl chloride per mole of Grignard reagent and 0.6 mole of tertiary butyl chloride per mole of Grignard are maintained in the electrolyte.

Example VI

The procedure is the same as in Example II except that 0.3 mole of methyl chloride per mole of Grignard reagent and 0.6 mole of tertiary butyl chloride per mole of Grignard reagent are maintained in the electrolyte.

Example VII

The procedure is the same as in Example III except that 0.3 mole of methyl chloride per mole of Grignard reagent and 0.6 mole of tertiary butyl chloride per mole of Grignard reagent are maintained in the electrolyte.

Example VIII

The procedure is the same as in Example IV except that 0.3 mole of methyl chloride per mole of Grignard reagent and 0.6 mole of tertiary butyl chloride per mole of Grignard reagent are maintained in the electrolyte.

Example IX

The procedure is the same as in Examples I to IV, respectively, except that 0.45 mole of methyl chloride per mole of Grignard reagent and 0.9 mole of ethyl chloride per mole of Grignard reagent are maintained in the electrolyte. In this example no tertiary butyl chloride is used. The concentration of methyl magnesium chloride in the solution is 1.4 millimoles per gram of solution. The average current is 10 amperes and the voltage averages 28 volts. The product is a mixture of organic lead compounds, including tetraethyl lead, tetramethyl lead, triethylmethyl lead, diethyldimethyl lead and trimethylethyl lead. The run is carried out for 20 hours.

Example X

The procedure is the same as in Example I except that phenyl chloride is used in place of tertiary butyl chloride and the run is carried out for 20 hours.

Example XI

The procedure is the same as in Example I except that cyclohexyl chloride is used in place of tertiary butyl chloride and the run is carried out for 10 hours.

Example XII

The procedure is the same as in Example I except that the Grignard reagent consists of a mixture of methyl magnesium chloride and ethyl magnesium chloride dissolved in the dibutylether of diethylene glycol in proportions of about 1 mole of said diether per mole of the mixed Grignard reagents. The temperature of the solution is maintained at 30° C., extraneous tertiary butyl chloride is added to the solution in an amount initially corresponding to 0.5 mole per mole of mixed Grignard and this concentration is maintained by adding additional amounts of tertiary butyl chloride as needed during the process. The run is carried out for 10 hours at a voltage of 28 volts and an average amperage of 6 amperes. The product is a mixture of organic lead compounds containing methyl, ethyl and tertiary butyl radicals linked to metallic lead.

Example XIII

The procedure is the same as in Example XII except that 1 mole of tetrahydrofuran per mole of total Grignard reagent is added to the electrolyte initially and the run is carried out with an average current of 10 amperes for a period of 20 hours.

Example XIV

The procedure is the same as in Example XII except that one mole of tetrahydrofuran per mole of total Grignard reagent and 4.5 moles of benzene per mole of total Grignard reagent are added to the electrolyte initially. The run is carried out at a temperature of 40° C. for 11.5 hours at an average current of 20 amperes and an average voltage of 29 volts.

Example XV

The procedure is the same as in Examples XII, XIII and XIV, respectively, except that 0.45 mole of methyl chloride per mole of total mixed Grignard reagents is maintained in the solution during the process.

Example XVI

The procedure is the same as that described in Examples XII, XIII and XIV, respectively, except that 0.7 mole of extraneous ethyl chloride per mole of total mixed Grignard reagents is maintained in the solution during the process.

It will be understood that in the foregoing examples secondary butyl chloride can be substituted for tertiary butyl chloride. Likewise, isobutyl chloride can be substituted for tertiary butyl chloride in the examples. Similarly, other organic halides can be used either by employing two or more organic halides with a single Grignard reagent or by employing two or more organic halides with a mixed Grignard reagent or by employing a single organic halide with a mixed Grignard reagent. In any case, products are obtained containing at least two different organic radicals linked to metallic lead.

As previously indicated the invention is especially valuable in those cases where a readily prepared Grignard reagent is used or a readily prepared mixture of Grignard reagents is employed in conjunction with two or more extraneous organic halides which do not readily form Grignard reagents, including particularly tertiary butyl chloride, tertiary butyl bromide and tertiary butyl iodide and other organic halides containing 4 to 18 carbon atoms.

The optimum conditions will vary depending upon the particular organic halides used but it is preferable to operate with a total concentration of extraneous organic halides within the range of 0.1 to 1.1 moles per mole of total Grignard reagent. The reaction can be controlled by varying the respective concentrations of the two or more organic halides used in carrying out the process.

It will be recognized that various methods, including fractional distillation, vacuum distillation and steam distillation, may be employed in recovering the products. The present invention is not concerned with the particular manner in which the products are recovered nor is it concerned with the particular solvents used for the Grignard reagent. Furthermore, the critical point of the invention does not lie in the particular voltages or amperages used. These may vary within relatively wide limits. Thus, the voltages are usually within the ranges of 2 to 35 volts and the current requirements are normally within the range of 2 amperes to 30 amperes. The current density will usually vary within the range of about 2 amperes per square foot to 30 amperes per square foot. The optimum current density will vary somewhat depending upon the temperature. In general, the higher the temperature used, the higher the current density. The temperatures of 30° C., 35° C., 40° C., 45° C., and 50° C. can be used with satisfactory results.

In some of the examples, tetrahydrofuran has been added because it has been found that this addition increases the conductivity initially and shortens the run. This results in less gas formation due to the shorter run. However, the process may be carried out without tetrahydrofuran. Where tetrahydrofuran is employed it is preferable to use about 0.5 to 1.5 moles per mole of total Grignard reagent. Higher concentrations appear to produce side reactions or side physical effects which are undesirable.

In carrying out the process the initial Grignard concentration is subject to wide variation but is preferably within the range of 0.5 to 2.5 millimoles per gram of solution.

It is also desirable as shown in some of the examples to carry out the process with an aromatic hydrocarbon, preferably benzene, and in some cases, it is desirable to use both tetrahydrofuran and benzene in the initial solution. The best results are obtained by employing about 3 to 7.5 moles of aromatic hydrocarbon per mole of Grignard. Where both tetrahydrofuran and an aromatic hydrocarbon, such as benzene, are employed, it is preferable to use an amount within a weight ratio of tetrahydrofuran to aromatic hydrocarbon of 1:4 to 1:7.

The initial Grignard solution preferably contains at least one mole per mole of total Grignard reagent of a dialkylether of a polyoxyalkylene glycol containing 2 to 4 oxygen atoms in the glycol, 2 to 4 carbon atoms in the alkylene groups of the glycol, and 2 to 8 carbon atoms in the alkyl groups of the ether radicals.

It will be seen from the foregoing description that the present invention makes it possible to prepare organic compounds of lead in which at least two different organic radicals are linked to the lead atom. Specific examples of such compounds are those in which methyl and ethyl radicals are linked to lead, or those in which methyl and propyl radicals are linked to lead, or those in which ethyl and propyl radicals are linked to lead, or those in which methyl and isopropyl radicals are linked to lead, or those in which ethyl and isopropyl radicals are linked to lead, or those in which methyl and n-butyl radicals are linked to lead, or those in which methyl and isobutyl radicals are linked to lead, or those in which methyl and secondary butyl radicals are linked to lead, or those in which methyl and tertiary butyl radicals are linked to lead, or those in which ethyl and n-butyl radicals are linked to lead, or those in which ethyl and isobutyl radicals are linked to lead, or those in which ethyl and secondary butyl radicals are linked to lead, or those in which ethyl and tertiary butyl radicals are linked to lead, or those in which methyl and amyl radicals are linked to lead, or those in which methyl and isoamyl radicals are linked to lead, or those in which methyl and tertiary amyl radicals are linked to lead, or those in which ethyl and amyl radicals are linked to lead, or those in which ethyl and isoamyl radicals are linked to lead, or those in which ethyl and tertiary amyl radicals are linked to lead, or those in which propyl and n-butyl radicals are linked to lead, or those in which propyl and secondary butyl radicals are linked to lead, or those in which propyl and tertiary butyl radicals are linked to lead, or those in which isopropyl and n-butyl radicals are linked to lead, or those in which isopropyl and secondary butyl radicals are linked to lead, or those in which isopropyl and isobutyl radicals are linked to lead, or those in which isopropyl and tertiary butyl radicals are linked to lead, or those in which methyl and phenyl radicals are linked to lead, or those in which ethyl and phenyl radicals are linked to lead, or those in which propyl and phenyl radicals are linked to lead, or those in which isopropyl and phenyl radicals are linked to lead, or those in which butyl and phenyl radicals are linked to lead, or those in which isobutyl and phenyl radicals are linked to lead, or those in which secondary butyl and phenyl radicals are linked to lead, or those in which tertiary butyl and phenyl radicals are linked to lead, or those in which methyl and cyclohexyl radicals are linked to lead, or those in which ethyl and cyclohexyl radicals are linked to lead, or those in which propyl and cyclohexyl radicals are linked to lead, or those in which isopropyl and cyclohexyl radicals are linked to lead, or those in which n-butyl and cyclohexyl radicals are linked to lead, or those in which secondary butyl and cyclohexyl radicals are linked to lead, or those in which isobutyl and cyclohexyl radicals are linked to lead, or those in which tertiary butyl and cyclohexyl radicals are linked to lead, or those in which ethyl and benzyl radicals are linked to lead, or those in which propyl and benzyl radicals are linked to lead, or those in which isopropyl and benzyl radicals are linked to lead, or those in which n-butyl and benzyl radicals are linked to lead, or those in which secondary butyl and benzyl radicals are linked to lead, or those in which isobutyl and benzyl radicals are linked to lead, or those in which tertiary butyl and benzyl radicals are linked to lead, and the like.

An important feature of the invention resides in the fact that the type of organic radical linked to lead can be controlled by controlling the kind and quantity of the extraneous organic halides, especially where two extraneous organic halides are used wherein one of the organic radicals of the organic halide is different from the organic radical of the other organic halide. In such a case, where the reaction is started with a single Grignard reagent, mixtures of Grignard reagents may ultimately be formed and the nature of such mixtures will depend upon the kind and amount of the organic halides added. While the invention is especially useful where the organic radicals of the halide are alkyl radicals, such as methyl, ethyl, propyl, isopropyl, n-butyl, secondary butyl, isobutyl, tertiary butyl, amyl, isoamyl, tertiary amyl, hexyl, and higher homologues, it is also useful where the organic radicals are cyclo aliphatic, such as cyclohexyl or cyclopentyl, or where they are aromatic, such as phenyl, or where they are aralkyl, such as benzyl.

The invention is hereby claimed as follows:

1. A process for preparing organic lead compounds containing different organic radicals linked to the same metallic lead atom which comprises electrolyzing, using a lead anode, a substantially anhydrous solution of at least one Grignard reagent in a substantially inert solvent for said Grignard reagent, and adding at least one extraneous organic halide to said solution, the organic radical of at least one said organic halide being different from the organic radical of at least said Grignard reagent.

2. A process as claimed in claim 1 in which at least one said Grignard reagent is formed from a primary alkyl halide and magnesium and at least one said extraneous organic halide is a tertiary alkyl halide.

3. A process for preparing organic lead compounds containing different organic radicals linked to the same metallic lead atom which comprises electrolyzing, using a lead anode, a substantially anhydrous solution which initially contains only one Grignard reagent in a substantially inert solvent for said Grignard reagent, and adding a plurality of extraneous organic halides to said solution, the organic radical of at least one of said organic halides being different from the organic radical of said initial Grignard reagent.

4. A process as claimed in claim 3 in which said Grignard reagent is an alkyl Grignard reagent formed from a primary alkyl halide and magnesium and at least one of said extraneous organic halides is an alkyl halide.

5. A process for preparing organic lead compounds containing different organic radicals linked to the same metallic lead atom which comprises electrolyzing, using a lead anode, a substantially anhydrous solution of methyl magnesium chloride in a substantially inert solvent for said methyl magnesium chloride, and adding a plurality of different extraneous alkyl chlorides to said solution.

6. A process as claimed in claim 5 in which at least one of said extraneous alkyl chlorides is ethyl chloride.

7. A process as claimed in claim 5 in which at least one of said extraneous alkyl chlorides is tertiary butyl chloride.

8. A process for preparing organic lead compounds containing different organic radicals linked to the same metallic lead atom which comprises electrolyzing, using a lead anode, a substantially anhydrous solution of ethyl magnesium chloride in a substantially inert solvent for said ethyl magnesium chloride, and adding a plurality of different extraneous alkyl chlorides to said solution.

9. A process for preparing organic lead compounds containing different organic radicals linked to the same metallic lead atom which comprises electrolyzing, using a lead anode, a substantially anhydrous solution of methyl magnesium chloride in a substantially inert solvent for said methyl magnesium chloride, and adding both methyl chloride and ethyl chloride to said solution during the electrolysis.

10. A process for preparing organic lead compounds containing different organic radicals linked to the same metallic lead atom which comprises electrolyzing, using a lead anode, a substantially anhydrous solution of methyl magnesium chloride in a substantially inert solvent for said methyl magnesium chloride, and adding both methyl chloride and tertiary butyl chloride to said solution during the electrolysis.

11. An electrolyte for making organic lead compounds comprising a substantially anhydrous solution of at least one Grignard reagent in a substantially inert solvent for said Grignard reagent and at least one extraneous organic halide, and the organic radical of at least one said Grignard reagent being different from the organic radical of at least one said organic halide, the total concentration of extraneous organic halides being within the range of 0.1 to 1.1 moles per mole of total Grignard reagent.

12. An electrolyte for making alkyl lead compounds comprising an anhydrous solution of at least one Grignard reagent in which the organic radical is an alkyl radical and a plurality of extraneous alkyl halides having different alkyl groups from one another, all dissolved in a substantially inert solvent for the Grignard reagent and the alkyl halides, the total concentration of said extraneous alkyl halides being within the range of 0.1 to 1.1 moles per mole of said Grignard reagent.

13. An electrolyte for making organic lead compounds comprising a substantially anhydrous solution of at least one Grignard reagent in a substantially inert solvent for said Grignard reagent and at least one extraneous organic halide, and the organic radical of at least one said Grignard reagent being different from the organic radical of at least one said organic halide, the total concentration of extraneous organic halides being within the range of 0.1 to 1.1 moles per mole of total Grignard reagent, and the Grignard concentration being within the range of 0.5 to 2.5 millimoles per gram of solution.

14. An electrolyte for making alkyl lead compounds comprising an anhydrous solution of at least one Grignard reagent in which the organic radical is an alkyl radical and a plurality of extraneous alkyl halides having different alkyl groups from one another, all dissolved in a substantially inert solvent for the Grignard reagent and the alkyl halides, the total concentration of said extraneous alkyl halides being within the range of 0.1 to 1.1 moles per mole of said Grignard reagent, and the Grignard concentration being within the range of 0.5 to 2.5 millimoles per gram of solution.

15. An electrolyte for making alkyl lead compounds comprising an anhydrous solution of at least one Grignard reagent in which the organic radical is an alkyl radical and a plurality of extraneous alkyl halides having different alkyl groups from one another, all dissolved in a substantially inert solvent for the Grignard reagent and the alkyl halides, the total concentration of said extraneous alkyl halides being within the range of 0.1 to 1.1 moles per mole of said Grignard reagent, said Grignard reagent being formed from a primary alkyl halide and magnesium and at least one of said extraneous alkyl halides being from the group consisting of secondary and tertiary alkyl halides.

16. An electrolyte for making alkyl lead compounds comprising an anhydrous solution of at least one Grignard reagent in which the organic radical is an alkyl radical and a plurality of extraneous alkyl halides having different alkyl groups from one another, all dissolved in a substantially inert solvent for the Grignard reagent and the alkyl halides, said solvent containing at least one mole per mole of total Grignard reagent of a dialkylether of a polyoxyalkylene glycol containing 2 to 4 oxygen atoms in the glycol, 2 to 4 carbon atoms in the alkylene groups of the glycol, and 2 to 8 carbon atoms in the alkyl groups of the ether radicals, up to 1.5 moles of tetrahydrofuran per mole of total Grignard reagent, up to 7.5 moles of benzene per mole of Grignard reagent, 0.1 to 1.1 moles of said extraneous alkyl halides per mole of Grignard reagent, and a Grignard concentration of 0.5 to 2.5 millimoles per gram of solution.

17. An electrolyte as claimed in claim 16 in which the Grignard reagents are from the group consisting of methyl magnesium chloride, ethyl magnesium chloride, and mixtures thereof and the alkyl halides are methyl chloride and ethyl chloride.

References Cited

UNITED STATES PATENTS

| | | | |
|---|---|---|---|
| 3,088,885 | 5/1963 | McKay | 204—59 |
| 3,007,857 | 11/1961 | Braithwaite | 204—59 |
| 3,007,858 | 11/1961 | Braithwaite | 204—59 |
| 2,535,193 | 12/1950 | Calingaert et al. | 260—437 |

FOREIGN PATENTS 839,172  6/1960  Great Britain.

OTHER REFERENCES

Pearson et al., "Transactions of the Electrochemical Society," vol. 82 (1942), pp. 297–304.

HOWARD S. WILLIAMS, *Primary Examiner.*

JOHN R. SPECK, JOHN H. MACK, WINSTON A. DOUGLAS, *Examiners.*

B. JOHNSON, *Assistant Examiner.*